United States Patent
Harrison et al.

(10) Patent No.: US 10,829,629 B2
(45) Date of Patent: Nov. 10, 2020

(54) VINYL CHLORIDE POLYMERS AND COMPOSITIONS FOR ADDITIVE MANUFACTURING

(71) Applicant: Chemson Polymer-Additive AG, Arnoldstein (AT)

(72) Inventors: Greg Harrison, Eastern Creek (AU); Dennis Planner, Eastern Creek (AU); Joerg-Dieter Klamann, Eastern Creek (AU); Hugh Dennis, Eastern Creek (AU); Stephen Dennis, Eastern Creek (AU)

(73) Assignee: Chemson Polymer-Additive AG, Arnoldstein (AT)

( * ) Notice: Subject to any disclaimer, the term of this patent is extended or adjusted under 35 U.S.C. 154(b) by 207 days.

(21) Appl. No.: 15/770,146

(22) PCT Filed: Oct. 21, 2016

(86) PCT No.: PCT/IB2016/001580
§ 371 (c)(1),
(2) Date: Apr. 20, 2018

(87) PCT Pub. No.: WO2017/068415
PCT Pub. Date: Apr. 27, 2017

(65) Prior Publication Data
US 2018/0305536 A1 Oct. 25, 2018

(30) Foreign Application Priority Data
Oct. 23, 2015 (AU) .................................. 2015904359

(51) Int. Cl.
| | | |
|---|---|---|
| *C08L 27/06* | (2006.01) | |
| *C08K 5/00* | (2006.01) | |
| *C08L 27/24* | (2006.01) | |
| *B33Y 70/00* | (2020.01) | |
| *B33Y 10/00* | (2015.01) | |
| *B33Y 80/00* | (2015.01) | |
| *C08F 14/06* | (2006.01) | |

(52) U.S. Cl.
CPC .............. *C08L 27/06* (2013.01); *B33Y 10/00* (2014.12); *B33Y 70/00* (2014.12); *B33Y 80/00* (2014.12); *C08F 14/06* (2013.01); *C08K 5/005* (2013.01); *C08L 27/24* (2013.01); *C08L 2203/30* (2013.01)

(58) Field of Classification Search
CPC ......... B33Y 10/00; B33Y 70/00; C08L 27/04; C08L 27/06; C08L 27/08
See application file for complete search history.

(56) References Cited

U.S. PATENT DOCUMENTS

| | | | | |
|---|---|---|---|---|
| 3,925,337 A | * | 12/1975 | Heiberger ................ | C08F 8/20 525/331.6 |
| 5,100,946 A | | 3/1992 | Hung et al. | |
| 6,730,734 B1 | | 5/2004 | Hamilton et al. | |
| 2004/0137228 A1 | | 7/2004 | Monsheeimer et al. | |
| 2007/0197692 A1 | | 8/2007 | Monsheimer et al. | |
| 2016/0319122 A1 | | 11/2016 | Niessner et al. | |

FOREIGN PATENT DOCUMENTS

| | | | |
|---|---|---|---|
| CN | 104193904 A | 12/2014 | |
| EP | 0492803 A1 | 7/1992 | |
| JP | H0496952 A | 3/1992 | |
| JP | H04-304255 A | 10/1992 | |
| JP | 2000/169740 A | 6/2000 | |
| JP | 2007-523774 A | 8/2007 | |
| JP | 2015-221526 A | 12/2015 | |
| RU | 2332265 C2 | 8/2008 | |
| WO | WO 2004/069427 A1 | 8/2004 | |
| WO | WO 2014/143623 | 9/2014 | |
| WO | WO 2014/160362 A1 | 10/2014 | |
| WO | WO-2014160362 A1 * | 10/2014 | ........... B29C 64/165 |
| WO | WO 2015/091814 A1 | 6/2015 | |
| WO | WO 2016/135525 * | 9/2016 | |
| WO | WO 2016/135525 A1 | 9/2016 | |

OTHER PUBLICATIONS

Translation of WO 2016/135525 (2016) (Year: 2016).*
International Search Report and Written Opinion dated Mar. 21, 2017 in connection with Application No. PCT/IB2016/001580.
Chia et al., Recent Advances in 3D Printing of Biomaterials. J Biol Eng Mar. 1, 2015;9(4):14 pages. doi: https://doi.org/10.1186/s13036-015-0001-4.
Feng-Xian et al., Study on New Material of Grating which Used in Three-Dimensional Printing. Soc Imaging Sci Tech. 2008:167-70.
Sombatsompop et al., Improvement of Structural and Thermal Stabilities of Pvc and Wood/Pvc Composite by Zn and Pb Stearates, and Zeolite. Pure and Applied Chemistry. May 31, 2008:45(7);534-41. doi: https://doi.org/10.1080/10601320802100572.

* cited by examiner

*Primary Examiner* — Robert C Boyle
(74) *Attorney, Agent, or Firm* — Wolf, Greenfield & Sacks, P.C.

(57) ABSTRACT

The present disclosure is directed to a thermoplastic polymer for additive manufacturing, wherein the thermoplastic polymer is derived from a chlorinated monomer unit, wherein the thermoplastic polymer has a melt flow rae (MFR) suitable for additive manufacturing. The present disclosure is also directed to a method of making a 3D product formed by additive manufacturing, wherein the 3D product comprises a thermoplastic polymer derived from a chlorinated monomer unit or a thermoplastic composition comprising at least one thermoplastic polymer derived from a chlorinated monomer unit; and at least one stabiliser, wherein the thermoplastic polymer or composition has a MFR suitable for additive manufacturing.

25 Claims, No Drawings

VINYL CHLORIDE POLYMERS AND COMPOSITIONS FOR ADDITIVE MANUFACTURING

CROSS-REFERENCE TO RELATED APPLICATION(S)

This Application is a National Phase Application under 35 U.S.C. 371 of PCT International Application No. PCT/IB2016/001580, filed Oct. 21, 2016, which claims the benefit and priority of Australian Application No. 2015904359, filed Oct. 23, 2015. The entire contents of these applications are incorporated herein by reference in their entirety.

FIELD OF THE INVENTION

The present invention relates to chlorinated thermoplastic polymers for use in additive manufacturing (3D printing). In particular, the invention relates to chlorinated thermoplastic polymers and thermoplastic compositions comprising at least one thermoplastic polymer derived from a chlorinated monomer unit; and to a method of forming 3D products using 3D printing with such thermoplastics.

BACKGROUND TO THE INVENTION 3D printing is a widely used and evolving processing technique. The term "3D printing" summarises a large variety of ever evolving technologies, covering for example, metal-laser sintering, plastic powder sintering, UV curing and molten layer deposition techniques. A general overview of the techniques applied in this rapidly evolving application field is best provided by a search on the internet, as printed media has difficulties keeping up with the fast pace of evolving developments.

At its core, 3D printing is generally a process in which a three-dimensional structure is formed by the cumulative fusion of discreet particles (such as plastics and metals) layer by layer.

An example of a common technique for layering molten plastic to form 3D products is fused deposition modelling (FDM), which is also known as fused filament fabrication (FFF). This technique allows one or more plastic materials to be heated and deposited for cooling to form a 3D product. Due to the particular requirements for the FDM technology, the preferred polymers used as the printing material are acrylonitrile butadiene styrene (ABS) and polylactic acid (PLA). Other materials such as polycarbonates (PC), polyamides (PA) and polystyrenes (PS) are available, and more recently, polyether ether ketones (PEEK).

The commonly used ABS and PLA materials have several functional shortcomings. For example, ABS contracts as it cools, and therefore can be prone to "bowing" and/or "warping", which may result in mal-formations, and is very difficult to use without a heated bed. ABS dissolves in acetone and it, as well as PLA both absorb water from the air and therefore requires oven drying prior to use or storage in special containers to avoid water absorption. PLA also has a slow cooling rate and thus requires a cooling fan during use. It can also warp at about 50° C. Since PLA is made from organic materials, such as corn, it is biodegradable and is not as strong as ABS. Accordingly, characteristics such as the above as well as outdoor weathering performance, mechanical strength and flame retardancy are just some of the properties in need of improvement in new 3D printing materials.

Research has been undertaken to discover better performing 3D printable raw materials. Many past attempts have focussed on the use of different grades of engineering plastics, which have already been used, for example, in injection moulding. 3D printing-specific polymer modifications of such plastics have been introduced recently as a result (e.g. Ultem grades by Stratasys).

WO2010108076 describes a new biopolymer with improved impact strength, based on the crosslinking of biodegradable polymer chains.

U.S. Pat. No. 7,365,129 describes a new method of 3D printing from powders. The thermoplastic polymers disclosed in this U.S. Patent include PVC as one of the possible powder raw materials. However, this powder fusion technology is not comparable with fused deposition modelling (FDM) 3D printing. No further details of the PVC powder are provided in this U.S. Patent.

WO 9826013 describes inks for ink jet printing. The inks are composed of an ester amide resin, a "tackifying resin", and a colorant. The ester amide resin is composed of polymerized fatty acids that have been combined with long chain monohydric alcohols and diamines. PVC is mentioned as a "tackifying" resin component.

Although chlorinated thermoplastics, such as PVC have been disclosed in connection with 3D printing as discussed above, such chlorinated thermoplastics are yet to be used in general 3D printing applications for inclusion as common plastic raw materials.

In view of the growth of 3D printing, such as the fused deposition modelling (FDM) technique, in private home 3D printing, as well as in industrial applications (e.g., Arburg Freeformer and Big Area Additive Manufacturing (BAAM) technology) and the restriction in choice of alternative suitable polymers, the inventors set out to make available a cost competitive polymer with excellent properties that make it suitable for industrial as well as home use.

Thus, it would be beneficial to introduce another thermoplastic polymer as a building block for the 3D printing industry, which provides at least an improvement in any one or more of the characteristics of known 3D printable materials or at least provides different, and in many cases improved physical features and mechanical characteristics, when compared to those currently in use.

The invention disclosed herein seeks to alleviate any one or more of the disadvantages known in the art, or at least to provide an alternative thermoplastic polymer that may be suitable for forming structures with different and/or durable characteristics.

Any prior art reference or statement provided in the specification is not to be taken as an admission that such art constitutes, or is to be understood as constituting, part of the common general knowledge.

SUMMARY OF THE INVENTION

In one broadest form, the invention relates to a novel chlorinated thermoplastic polymer for additive manufacturing (3D printing).

In a first aspect, the present invention provides a thermoplastic polymer for additive manufacturing, wherein the thermoplastic polymer is derived from a chlorinated monomer unit, wherein the thermoplastic polymer has a melt flow rate (MFR) suitable for additive manufacturing. A suitable MFR may be determined at 205° C. according to ASTM D1238.

In a second aspect, the present invention provides a thermoplastic composition for additive manufacturing, wherein the thermoplastic composition comprises at least one thermoplastic polymer derived from a chlorinated monomer unit and at least one stabiliser, wherein the thermoplastic composition has a melt flow rate (MFR) suitable for additive manufacturing. A suitable MFR may be determined at 205° C. according to ASTM D1238.

In one embodiment of the second aspect, the thermoplastic composition further comprises at least one lubricant.

In another embodiment of the first or second aspect, the MFR is from 0.5 to 30, as determined at 205° C. according to ASTM D1238. Preferably the MFR is from 2 to 20, as determined at 205° C. according to ASTM D1238. More preferably, the MFR is from 5 to 15, as determined at 205° C. according to ASTM D1238.

In another embodiment of the first or second aspect, the thermoplastic polymer or thermoplastic composition has a relevant tensile strength. As used herein the term "tensile strength" refers to the tensile strength of the resulting 3D printed product comprising the thermoplastic polymer or thermoplastic composition. The term "relevant tensile strength" means that the thermoplastic polymer or thermoplastic composition is capable of forming a 3D printed product that does not substantially break apart, fracture and/or is non-cleaving during (or after) 3D printing processing conditions, while providing a physically robust end product.

In another embodiment of the first or second aspect, the tensile strength of the thermoplastic polymer or thermoplastic composition is from about 15 to about 60 MPa. Preferably the tensile strength of the thermoplastic polymer or thermoplastic composition is from about 20 to about 60 MPa. Most preferably the tensile strength of the thermoplastic polymer or thermoplastic composition is about 30 MPa.

In another embodiment of the first or second aspect, the thermoplastic polymer is polyvinyl chloride or the thermoplastic composition comprises polyvinyl chloride (or CPVC). In this embodiment, the thermoplastic polymer or the thermoplastic polymer in the thermoplastic composition is PVC (or CPVC) and may be optionally copolymerised with co-monomer units selected from ethylenically unsaturated carboxylic acids, ethylenically unsaturated carbonates, ethylenically unsaturated urethanes, ethylenically unsaturated alcohols, ethylenically unsaturated aromatics, alkyl acrylates, alkyl methacrylates, ethylene vinyl alcohols, vinyl acetates, styrenes, and hydroxyalkanoic acid wherein the hydroxyalkanoic acids have five or fewer carbon atoms including glycolic acid, lactic acid, 3-hydroxypropionic acid, 2-hydroxybutyric acid, 3-hydroxybutyric acid, 4-hydroxybutyric acid, 3-hydroxyvaleric acid, 4-hydroxyvaleric acid, 5-hydroxyvaleric acid, or combinations of two or more thereof. The alkyl groups of any co-monomer units may comprise any number of carbon units sufficient to modify the molecular weight of the thermoplastic polymer chain. In one embodiment, the alkyl groups of the alkyl acrylates and alkyl methacrylates have from 1 to 10 carbon atoms. In embodiments where the thermoplastic polymer comprises monomeric units having carboxylic acid groups, at least a portion of the carboxylic acid groups in the copolymer may be neutralized to salts with alkali metal cations, alkaline earth metal cations, transition metal cations, or combinations thereof. The degree of neutralization may assist in modifying the observed viscosity of the thermoplastic polymer or the thermoplastic composition and thus achieve the desired flow rate.

In another embodiment of the first or second aspect, the thermoplastic polymer may be a blend of two or more thermoplastic materials selected from polyolefins, polyhydroxyalkanoates (PHA), polyesters including polyethylene terephthalates (PET), polyester elastomers, polyamides (PA) including nylons, polystyrenes including styrene maleic anhydrides (SMA) and acrylonitrile butadiene styrene (ABS), polyketones, polyvinyl chlorides (PVC), chlorinated polyvinyl chlorides (CPVC), polyvinylidene chlorides, acrylic resins, vinyl ester resins, polyurethane elastomers and polycarbonates (PC). In embodiments where a blend of thermoplastic materials is utilised, at least one of the thermoplastic materials is a polymer derived from a chlorinated monomeric unit.

In another embodiment of the first or second aspect, the thermoplastic polymer is a blend of polyvinyl chloride (or CPVC) and polyolefin wherein the polyolefin is linear low-density polyethylene, low-density polyethylene, middle-density polyethylene, high-density polyethylene, ethylene-vinyl acetate copolymer, ethylene-alkyl acrylate copolymer, ethylene-propylene copolymer, polypropylene, propylene-a-olefin copolymer, polybutene, polypentene, chloropolyethylene, chloropolypropylene, or combinations of two or more thereof.

In another embodiment of the first or second aspect, the thermoplastic polymer is polyvinyl chloride and has a K-value of between about 40 and about 80. The polyvinyl chloride may have a K-value of 45 to 48, 50 to 55, 58 to 60, 62 to 65, 66 to 68, 70 to 71, and 80. Preferably, the K-value is about 45, about 50, about 57 or about 71.

In another embodiment of the first or second aspect, the thermoplastic polymer or thermoplastic composition comprises any one or more of low and high molecular weight plasticisers (preferably low VOC plasticisers), higher molecular weight polymers, compatibilisers, fillers, reinforcing agents, pigments, modifiers and processing aids, release agents, flame retardants, anti-microbial additives and fungicides, blowing agents, conductivity agents, wood fibres, bamboo, chalk, metals and other additives.

In another embodiment of the first or second aspect, the at least one stabiliser is substantially free of lead, cadmium and/or barium.

In another embodiment of the first or second aspect, the thermoplastic polymer or thermoplastic composition is provided in the form of powders, powder-blends, pellets, granules or filaments.

In another embodiment of the first or second aspect, the thermoplastic polymer or thermoplastic composition is used in fused deposition modelling (FDM) printing or a fused filament fabrication (FFF) printing.

In a third aspect, the present invention provides a method of making a 3D product with an additive manufacturing machine, the method comprising the step of forming a product comprising the thermoplastic polymer or thermoplastic composition according to any one or more of the above embodiments of the first or second aspects.

In another embodiment of the third aspect, the additive manufacturing machine utilises a fused deposition modelling (FDM) or a fused filament fabrication (FFF) technique.

In a fourth aspect, the present invention provides a method of making a 3D product formed by additive manufacturing, wherein the 3D product comprises a thermoplastic polymer derived from a chlorinated monomer unit, wherein the thermoplastic polymer has a melt flow rate (MFR) suitable for additive manufacturing.

In a fifth aspect, the present invention provides a method of making a 3D product formed by additive manufacturing wherein the 3D product comprises a thermoplastic composition comprising at least one thermoplastic polymer derived from a chlorinated monomer unit and at least one stabiliser, wherein the thermoplastic composition has a melt flow rate (MFR) suitable for additive manufacturing.

In one embodiment of the fifth aspect, the thermoplastic composition further comprises at least one lubricant.

In another embodiment of the fourth or fifth aspect, the 3D product comprises the thermoplastic polymer or thermoplastic composition according to any one or more of the above embodiments of the first or second aspects.

In a sixth aspect, the present invention provides a 3D product formed by additive manufacturing, wherein the 3D product comprises a thermoplastic polymer derived from a chlorinated monomer unit, wherein the thermoplastic polymer has a melt flow rate (MFR) suitable for additive manufacturing.

In a seventh aspect, the present invention provides a 3D product formed by additive manufacturing, wherein the 3D product comprises a thermoplastic composition comprising at least one thermoplastic polymer derived from a chlorinated monomer unit and at least one stabiliser, wherein the thermoplastic composition has a melt flow rate (MFR) suitable for additive manufacturing.

In one embodiment of the sixth or seventh aspect, the 3D product comprises the thermoplastic polymer or thermoplastic composition according to any one or more of the above embodiments of the first or second aspects.

The nature of the invention will become apparent to the person skilled in the art reading the detailed description of the embodiments, preferred embodiments and most preferred embodiments as described herein.

DETAILED DESCRIPTION OF THE INVENTION

Where the terms "comprise", "comprises", "comprising", "include", "includes", "included" or "including" are used in this specification, they are to be interpreted as specifying the presence of the stated features, integers, steps or components referred to, but not to preclude the presence or addition of one or more other feature, integer, step, component or group thereof.

As used herein, the term "derived from" in the context of polymers means that the specified monomeric unit is at least one of the monomeric units included in the polymer chain. The term is not limited to mean that the specified monomeric unit is the only monomeric unit in the polymer chain. Additionally, the term does not limit the monomeric unit to be a derivative thereof.

As used herein the term "tensile strength" refers to the tensile strength of the resulting 3D printed product comprising the thermoplastic polymer or thermoplastic composition.

As used herein, the term "relevant tensile strength" means that the thermoplastic polymer or thermoplastic composition is capable of forming a 3D printed product that does not substantially break apart, fracture and/or is non-cleaving during (such as demoulding from the printer base), or after, the 3D printing process.

As used herein, the term "suitable for additive manufacturing" means that the thermoplastic polymer or thermoplastic composition does not degrade under 3D printing processing conditions.

Also, the indefinite articles "a" and "an" preceding an element or component of the invention are intended to be non-restrictive regarding the number of elements or components. Therefore, the words "a" or "an" should be read as including one or at least one, and the singular word form of the element or component also includes the plural, unless the number is obviously meant to be singular.

The following description refers to specific embodiments of the present invention and is in no way intended to limit the scope of the present invention to those specific embodiments.

According to one embodiment of the present invention the thermoplastic polymer comprises at least one thermoplastic polymer derived from a chlorinated monomer unit, wherein the thermoplastic polymer has a melt flow rate (MFR) suitable for additive manufacturing.

According to another embodiment of the present invention the thermoplastic composition comprises at least one thermoplastic polymer derived from a chlorinated monomer unit and at least one stabiliser, wherein the thermoplastic composition has a melt flow rate (MFR) suitable for additive manufacturing. Preferably, the thermoplastic composition comprises at least one lubricant.

A suitable MFR may be determined at 205° C. according to ASTM D1238.

A suitable MFR provides a melt flow of the thermoplastic polymer or thermoplastic composition that allows suitable fluidity for the melt deposition step in 3D printing.

In some embodiments, the thermoplastic polymer or thermoplastic composition is in form of filaments, pellets, granules, powders or powder blends. The form of the thermoplastic polymer or thermoplastic composition should be dictated by the type of 3D printer to be used and/or the 3D printing technique to be utilised. For example, for FDM 3D printing using the thermoplastic polymer or thermoplastic composition of the present invention the thermoplastic polymer or thermoplastic composition is in the form of filaments, or extruded in-situ as a part of the 3D printing deposition process.

The thermoplastic polymer or thermoplastic composition of the present invention is highly versatile and may have a specific average molecular weight suitable for its intended purpose. As will be known to those in the art, the average molecular weight will be dictated by the distribution of polymers of varying molecular weights such as a high, mid or low average molecular weight distribution.

In one preferred embodiment, the thermoplastic polymer or thermoplastic composition comprises polyvinyl chloride (PVC) and/or chlorinated polyvinyl chloride (CPVC). It would be understood that the chlorine content of CPVC should generally be about 56 to 74% by mass. However, the chlorine content of most commercially available CPVC is about 63 to 69% by mass. In this preferred embodiment, the PVC and/or CPVC may be used as the base polymer (i.e., a copolymer or a component of a polymer blend) or may be the sole polymer (i.e., a homopolymer). When a homopolymer of PVC is used, it may be selected from the commercially available PVC, which comes in various molecular weights and which are characterised by a K-value. In a preferred embodiment, the K-value may be 40 to 45, 50 to 55, 58 to 60, 62 to 65, 66 to 68, 70 to 71 and 80. In a most preferred embodiment, the K-value is from 45 to 71 In this embodiment, the thermoplastic polymer or thermoplastic composition comprising polyvinyl chloride (PVC), either as a copolymer (including polymer blends) or homopolymer, may be modified by incorporating one or more auxiliaries, modifiers, processing aids, additives and functional additives to impart desired characteristics and/or properties.

Generally, the thermoplastic polymer or thermoplastic composition of the present invention may comprise one or more additives. The inclusion of additives may influence the overall melt flow characteristics. Certain additives may increase the viscosity and thereby reduce melt flow, whilst certain additives may decrease the viscosity and thereby increase melt flow. The addition of additives may also influence, and in some situations may interfere with other characteristics and/or desired properties such as, but not limited to, hardness and stiffness, surface gloss, interlayer adhesion, bowing and shrinkage.

The versatility of the thermoplastic polymer or thermoplastic composition of the present invention allows it to be used in a large variety of 3D printing applications, including but not limited to, modelling, prototyping, rigid pipes, profiles, rigid pharma packaging, semi-flexible pharma packaging, flexible cables, soft bags and assorted 3D-printed polymer items, such as toys, plastic devices, gadgets, discrete objects, and "polymer-widgets".

The inventors have identified an unusual requirement of the thermoplastic polymer or thermoplastic composition of the present invention, in the requirement of good inter-layer adhesion between the non-pressure applied layers, for example, as in 3D FDM printing. Most plastics processing is done under high pressure and shear conditions. In order to withstand these processing conditions, certain thermoplastic polymers, such as PVC and CPVC are best used as a thermoplastic composition blended with heat stabilisers and lubricants, which provide the release properties from the hot metal processing surfaces. The stabilisers and lubricants that are essential for normal processing using generally available thermoplastic polymers were found to severely affect the inter-layer adhesion requirements under the additive manufacturing processing conditions required for 3D FDM printing.

Since certain chlorinated thermoplastic polymers, such as PVC and CPVC, are prone to degradation at high temperatures and therefore cannot be processed adequately without addition of stabilisers and lubricants, currently used formulations in non-3D printing applications have proven to be unsuitable for adequate 3D printing.

It was thus found that certain chlorinated thermoplastic polymers and compositions (such as PVC and CPVC compositions) needed to provide a lower than usual melt viscosity. The lower melt viscosity may be based on lower molecular weight thermoplastic polymers, or as thermoplastic copolymers. In some cases, the thermoplastic polymer or thermoplastic composition may be in combination with additives such as plasticisers and/or process aids in the correct amounts to achieve acceptable 3D printing results.

The "melt flow index" (MFI) typically measured in thermoplastics by establishing a "Melt Flow Rate" is not normally used to define chlorinated thermoplastic polymer or composition properties, such as PVC or PVC composition properties because the flow behaviour under low pressure is not suitable to sufficiently characterise standard PVC processing properties.

For chlorinated thermoplastic polymers, such as PVC, special requirements are defined for measuring the MFR. For PVC, MFR is normally determined using ASTM D3364. Contrary to these typical PVC requirements, it was surprisingly found that the properties needed for PVC 3D printing compositions allowed them to be characterised by the standard methods used for normal flowing thermoplastic polymers, according to ASTM D1238, Procedure A or ISO 1133 Procedure A and thus being atypical for PVC.

It was found that in order to 3D print chlorinated thermoplastics, such as PVC and CPVC, the PVC/CPVC composition is to have a melt viscosity, as determined according to ASTM D1238 Procedure A in the Melt Flow Rate (MFR) range of 0.5 to 30, preferably 2 to 20, more preferably 5 to 15, measured according to ASTM D1238, Procedure A, at 205° C. with a 2.16 kg nominal weight and a die of bore diameter=2.0955+/−0.0051 mm, bore length=8+/−0.025 mm. The MFR of PLA has been approximated to be 7 to 9 at 195° C.; whilst the MFR of ABS has been approximated to be 8 to 10 at 230° C., when compared against the MFR of the chlorinated thermoplastic polymer or thermoplastic composition of the present invention.

For FDM 3D printing, adequate adhesion between the 3D printed layers (i.e., inter-layer adhesion) is an important requirement. This is because good layer adhesion results in a product with homogeneous mechanical properties, which in the case of rigid products may demonstrate "brittle failure" behaviour, not aligned to the melt-layer and flow direction. A semi-flexible or flexible product may "tear" in an amorphous manner.

The thermoplastic polymer or thermoplastic composition preferably has suitable adhesion between the relatively pressure-free applied melt layers for printing the resulting 3D product and to achieve the desired mechanical properties. Most preferably, the thermoplastic polymer or thermoplastic composition provides excellent overall definition, low warpage and dimensional stability compared to the reference digital 3D product model. The thermoplastic polymer or thermoplastic composition comprising the chlorinated thermoplastic polymer adheres with other polymers including, but not limited to, acrylonitrile-butadiene-styrene (ABS), acrylonitrile-styrene-acrylate (ASA), cellulose acetate (CA), polycarbonate (PC), poly(methyl methacrylate) (PMMA), polybutylene terephthalate (PBTP), thermoplastic polyimide (TPI) and styrene acrylonitrile (SAN).

The layer adhesion can be influenced by many parameters, such as printing temperature, printing speed and layer thickness. Whereas these parameters are influenced by the printing process settings, whilst the actual chlorinated thermopolymer (e.g., PVC) based composition has a strong influence on the inter-layer adhesion, being much more adhesive than the composition of the alternative thermoplastics currently used in 3D FDM printing.

It was found that the chlorinated thermopolymer or thermopolymer composition (e.g., PVC/CPVC), with the MFR as described herein, also preferably needs to provide good overall inter-layer adhesion to achieve suitable 3D FDM printed products. A good inter-layer adhesion may be observed by a high tensile strength coupled with a homogenous brittle-failure behaviour of a 3D-printed product.

The chlorinated thermopolymer or thermopolymer composition (e.g., PVC) correctly formulated for 3D-printing applications according to the present invention having a low MFI range possesses a highly stable, true thermo-plasticity with far less rheological behaviour as compared to normally available chlorinated thermopolymer (e.g., PVC) compositions marketed for use in non-3D printing applications.

The inventors have identified that when the conventional ratios and levels of stabilising components are applied at commonly recommended levels, the stabilising components do not provide a useful thermoplastic composition suitable for 3D printing.

The inventors have also identified that reducing the inter-layer adhesion does not allow the continuous build up of thermopolymer to achieve a strong and/or robust 3D product. Furthermore, the inventors have identified that the tensile strength, as measured according to tensile test standards ASTM D638, provides a measurable relative adhesive strength of a 3D printable product.

The at least one stabiliser used in the thermoplastic composition of the present invention preferably include stabilizers that are suitably compatible with chlorinated thermoplastic polymers (such as PVC and CPVC). Stabilisers are essential because these prevent or at least reduce decomposition of the chlorinated thermopolymer by releasing hydrogen chloride, for example when the thermopolymer is PVC. Representative examples of stabilisers for 3D printable compositions of chlorinated thermoplastic polymers (e.g., PVC) are selected from PVC stabilisers known in the PVC industry comprising any one or more of tin, lead, cadmium, mixed metals including rare earths, calcium/zinc and organic stabilisers.

It should be understood that stabilisers comprising metals based on lead, barium and cadmium should be avoided, if possible, due to their inherent toxicity to living organisms, such as mammals and humans. Additionally, sulfur-tin based stabilisers that are commonly available should also be avoided, if possible, due to their potential volatility during 3D processing conditions and the resulting unpleasant sulphur smell.

The choice of stabiliser may depend on several factors, such as the technical requirements of the thermoplastic polymer and any regulatory approval requirements of any specific country or jurisdiction, and the cost of the stabiliser may also be a factor.

In some embodiments, co-stabilisers may be utilised. These co-stabilisers may be the same as the stabilisers as described above and may provide a synergistic effect and provide an enhanced performance in certain circumstances.

The stabilisers that provide the most favourable thermoplastic compositions for 3D printing are stabilisers based on mixed metals, such as calcium-zinc stabilisers, and zinc-free organic stabiliser systems, commonly called organic-based stabiliser (OBS®, COS, HMF) systems.

Some representative examples of tin stabilisers are methyl-tin-mercaptides, butyl-tin-mercaptides, octyl-tin-mercaptides, reverse-ester tin stabilisers, tin-maleates, and tin-carboxylates.

Mixed metal stabilisers are often complex mixtures of many (possible) components, especially for the preferred stabiliser systems. Some representative examples of the components in mixed metal stabilisers are metal soaps of sodium, calcium, magnesium, zinc, rare earths such as lanthanum and cerium, and other metals such as lead, cadmium and barium. The soap component may be based on naturally occurring or synthetic fatty acids of various chain lengths including $C_8$ to $C_{40}$ such as $C_{18}$ (oleic, stearic, and linoleic acids), $C_{20}$ (eicosapentaenoic acid), $C_{22}$ (docosahexaenoic acid), and $C_{28}$ (montanic acids), and other acids such as benzoic acid and adipic acid. In some embodiments, soaps incorporating a more than stoichiometric amount of metal (e.g., basic or over-based soaps) may be included.

In some embodiments, the metal soap combinations may be combined with synergistically active components, such as polyols. Representative examples of polyols that may be used in the thermoplastic compositions of the present invention include, but are not limited to, pentaerythritol, dipentaerythritol, tripentaerythritol, tris(hydroxyethyl) isocyanurate (THEIC), trimethylol propane (TMP), bis-trimethylol propane, inositol, polyvinylalcohol, sorbitol, maltitol, isomaltitol, mannitol, and lactose. Partial esters of polyols with fatty acids or oligomeric polyol-polyacid compounds may be used as stabilising components (e.g. Plenlizer grades).

In some embodiments, the metal soap combinations may be combined with inorganic co-stabilisers. Representative examples of inorganic co-stabilisers include, but are not limited to, metal oxides, hydroxides and salts (such as perchlorate or superacid-salts), hydrotalcites, hydrocalumites, calcium-hydroxy-aluminium-phosphites (CHAP), katoites, dawsonites, calcium aluminium hydroxycarbonates (CAHC) and zeolites. Other inorganic co-stabilisers that may be used and that are compatible with the present thermoplastic compositions are described in literature relating to PVC.

In some embodiments, the metal soap combinations may be combined with organic co-stabilisers. Representative examples of organic co-stabilisers include, but are not limited to, beta-diketones and beta-keto-ester costabilisers, such as 1,3-diketones (including alkali, alkali earth and zinc chelates thereof), dibenzoylketones, stearoylbenzoylketones, acetylacetones, beta-keto esters, dihydroacetic acids and acetoacetic acid esters, and malonic acids and its esters.

In some embodiments, the metal soap combinations may be combined with dihydropyridines and polydihydropyridines. Representative examples of dihydropyridines and polydihydropyridines are described in EP286887, and include dimethyl aminouracil (DMAU) and didodecyl 1,4-dihydro-2,6-dimethylpyridine-3,5-dicarboxylate.

In some embodiments, the metal soap combinations may be combined with epoxides and glycidyl compounds. Representative examples of epoxides and glycidyl compounds include, but are not limited to, epoxidised fatty acid esters and oils (e.g., ESBO, epoxidised linseed oil), glycidyl ethers of bisphenol A, THEIC and other polyols.

In some embodiments, the metal soap combinations may be combined with organic phosphites. Representative examples of organic phosphites include, but are not limited to, arylalkyl phosphites (e.g. diphenylisodecyl phosphite, DPDP), trialkyl phosphites (e.g. triisodecyl phosphite, TDP), thiophosphites and thiophosphates. Other examples of organic phosphites are disclosed in 'International Plastics Handbook', Hanser Publishing Munich, 2006, ISBN 3-56990-399-5; 'Plastics Additives Handbook', Hanser Publishing Munich, 2001, ISBN 3-446-19579-3; and 'PVC Handbook', Hanser Publishing Munich, 2005, ISBN 3-446-22714-8.

In some embodiments, the metal soap combinations may be combined with mercaptoesters and thio-compounds. Representative examples of mercaptoesters and thio-compounds include, but are not limited to, capped mercaptide technology (Advastab NEO products) and those that are described in EP768336.

In some embodiments, the metal soap combinations may be combined with antioxidants. Representative examples of antioxidants include, but are not limited to, organic sulphides, ionol (BHT), Irganox 1076 and Irganox 1010, and Santhowhite Powder. Other antioxidants that may be used in the present thermoplastic composition are disclosed in the 'Plastics Additives Handbook', Hanser Publishing Munich, 2001, ISBN 3-446-19579-3.

In some embodiments, the metal soap combinations may be combined with UV-stabilisers. Representative examples of UV-stabilisers include, but are not limited to, the so-called HALS-compounds with trade names such as Cimasorb, Tinuvin and Univul. Other UV-stabilisers that may be used in the present thermoplastic composition are disclosed in the 'Plastics Additives Handbook', Hanser Publishing Munich, 2001, ISBN 3-446-19579-3.

Preferred stabilising components can be any combination described in the literature, such as calcium-based stabilising systems, lead-based stabilising systems, barium-zinc-based stabilising systems, calcium-zinc-based stabilising systems, tin-based stabilising systems. The stabilizing systems with heavy-metals such as lead, barium and cadmium components may be suitable but not preferred for ecological reasons as a result of their heavy metal content. In some preferred embodiments, Ba-Zn stabilisers and Ca-Zn stabilisers may be used as metallic soaps (e.g., stearates), while in some embodiments, Sn stabilisers may be used as organic tin compounds (e.g., dialkyl tin compounds). In other embodiments, Pb stabilisers may be used as basic sulphate, basic carbonate, or basic phosphate.

Some examples of stabilising components include, but are not limited to, any one or more of the perchlorate compounds, glycidyl compounds, beta-diketones, beta-keto esters, dihydropyridines, polydihydropyridines, polyols, disaccharide alcohols, sterically hindered amines (such as tetraalkylpiperidine compounds), alkali aluminosilicates (such as zeolites), hydrotalcites and alkali aluminocarbonates (such as dawsonites), alkali (or alkaline earth-) carboxylates,-(bi)carbonates or -hydroxides, antioxidants, lubricants or organotin compounds which are suitable for stabilising chlorine-containing polymers, especially PVC.

In one preferred embodiment, the stabilising component is a perchlorate compound of formula $M(ClO_4)_n$, wherein M is Li, Na, K, Mg, Ca, Sr, Zn, Al, La or Ce and n is 1, 2 or 3, based on the nature of M. The perchlorate salts may be complexed with alcohols (such as polyols and/or cyclodextrins), ether alcohols or ester alcohols. The alcohols including the polyhydric alcohols or polyols may be in their dimeric, trimeric, oligomeric and polymeric forms, such as di-, tri-, tetra- and poly-glycols, and di-, tri-and tetra-pentaerythritol, or polyvinyl alcohol in various degrees of polymerisation. It would be understood that the perchlorate salts may be introduced in a variety of forms, for example, in the form of a salt or an aqueous solution applied to the thermoplastic component, such as PVC, or to any one or more of the substrate additives, calcium silicate, zeolites or hydrotalcites, or bound in a hydrotalcite by chemical reaction. Glycerol monoethers and glycerol monothioethers may be preferred as polyol partial ethers.

In certain embodiments, when the stabilizing component is a perchlorate, the percholates can be used in an amount of, for example, from 0.001 to 5, preferably from 0.01 to 3, more preferably from 0.01 to 2, parts by weight, based on 100 parts by weight of the thermoplastic component, such as PVC.

In another preferred embodiment, the stabilising component is a glycidyl compound.

In another preferred embodiment, the stabilising component is a 1,3-dicarbonyl compounds such as beta-diketone or beta-keto ester. Suitable examples of 1,3-dicarbonyl compounds and their alkali metal, alkaline earth metal and zinc chelates are acetylacetone, butanoylacetone, heptanoylacetone, stearoylacetone, palmitoylacetone, lauroylacetone, 7-tert-nonylthio-heptane-2,4-dione, benzoylacetone, dibenzoylmethane, lauroylbenzoylmethane, palmitoyl-benzoylmethane, stearoyl-benzoylmethane, isooctylbenzoylmethane, 5-hydroxycapronyl-benzoylmethane, tribenzoylmethane, bis(4-methylbenzoyl)methane, benzoyl-p-chlorobenzoylmethane, bis(2-hydroxybenzoyl)methane, 4 -methoxybenzoyl-benzoylmethane, bis(4-methoxybenzoyl)methane, 1-benzoyl-1-acetylnonane, benzoyl-acetyl-phenylmethane, stearoyl-4-methoxybenzoylmethane, bis(4-tert-butylbenzoyl)methane, benzoyl-fonnylmethane, benzoyl-phenylacetylmethane, biscyclohexanoyl-methane, di-pivaloyl-methane, 2-acetylcyclopentanone, 2-benzoylcyclopentanone, diacetoacetic acid methyl, ethyl and allyl ester, benzoyl-, propionyl- and butyryl-acetoacetic acid methyl and ethyl ester, triacetylmethane, acetoacetic acid methyl, ethyl, hexyl, octyl, dodecyl or octadecyl ester, benzoylacetic acid methyl, ethyl, butyl, 2-ethylhexyl, dodecyl or octadecyl ester, and propionyl- and butyryl-acetic acid C1-C18 alkyl ester. Stearoylacetic acid ethyl, propyl, butyl, hexyl or octyl ester and polynuclear beta-keto esters as described in EP 433 230 and dehydroacetic acid and the zinc, magnesium or alkali metal salts thereof The 1,3-diketo compounds may be used in an amount of, for example, from 0.01 to 10, preferably from 0.01 to 3, and more preferably from 0.01 to 2, parts by weight, based on 100 parts by weight of the thermoplastic component, such as PVC.

In another preferred embodiment, the stabilising component is a dihydropyridine or a polydihydropyridine. Suitable dihydropyridine and polydihydropyridine are described in, for example, EP 2007, EP 0 362 012, EP 0 286 887, EP 0 024 754, EP 0 286 887.

In another preferred embodiment, the stabilising component is a polyol or disaccharide alcohol. Suitable examples of polyol and disaccharide alcohol include, but are not limited to, pentaerythritol, dipentaerythritol, tripentaerythritol, bistrimethylolpropane, bistrimethylolethane, trismethylolpropane, inosite, polyvinylalcohol, sorbitol, maltite, isomaltite, lactite, lycasin, mannitol, lactose, leucrose, tris (hydroxyethyl) isocyanurate, palatinite, tetramethylolcyclohexanol, tetramethylolcyclopentanol, tetramethylolcyclopyranol, glycerol, diglycerol, polyglycerol, thiodiglycerol or 1-0-a-D-glycopyranosyl-D-mannitol dihydrate. Of these compounds disaccharide alcohols may be preferred.

The polyols and disaccharide alcohols may be used in an amount of, for example, from 0.01 to 20, preferably from 0.1 to 20, and more preferably from 0.1 to 10, parts by weight, based on 100 parts by weight of the thermoplastic component, such as PVC.

In another preferred embodiment, the stabilising component is a sterically hindered amine (such as tetraalkylpiperidine compounds). The sterically hindered amines may also be light stabilizers. They may be compounds of relatively low molecular weight (<700) or of relatively high molecular weight. In the latter case, they may be oligomeric or polymeric products. The sterically hindered amines may preferably be tetramethylpiperidine compounds having a molecular weight of more than 700 that contain no ester groups.

Suitable examples of sterically hindered amines, such as the polyalkylpiperidine compounds include, but are not limited to 4-hydroxy-2,2,6,6-tetramethylpiperidine, 1-allyl-4-hydroxy-2,2,6,6-tetramethylpiperidine, 1-benzyl-4-hydroxy-2 ,6,6-tetramethylpiperidine, 1-(4-tert-butyl-2-butenyl)-4-hydroxy-2,2,6,6-tetramethylpiperidine, 4-stearoyloxy-2,2,6,6-tetramethylpiperidine, 1-ethyl-4-salicyloyloxy-2,2,6,6-tetramethylpiperidine, 4-methacryloyloxy-1 ,2,2,6,6-pentamethylpiperidine, 1 ,2,2,6,6-pentamethylpiperidin-4-yl-β-(3,5-di-tert-butyl-4-hydroxyphenyl) propionate, di(1-benzyl-2,2,6,6-tetramethylpiperidin-4-yl) maleinate, di(2,2,6,6-tetramethylpiperidin-4-yl) succinate, di(2,2,6,6-tetramethylpiperidin-4-yl) glutarate, di(2,2,6,6-tetramethylpiperidin-4-yl) adipate, di(2,2,6,6-tetramethylpiperidin-4-yl) sebacate, di(1,2,2,6,6-pentamethylpiperidin-4-yl) sebacate, di(1,2,3,6-tetramethyl-2,6-diethylpiperidin-4-yl) sebacate, di(1-allyl-2,2,6,6-tetramethylpiperidin-4-yl) phthalate, 1-propargyl-4-beta-cyanoethyloxy-2,2,6,6-tetramethylpiperidine, 1-acetyl-2,2,6,6-tetramethylpiperidin-4-yl acetate, trimellitic acid tri(2,2,6,6-tetramethylpiperidin-4-yl) ester, 1-acryloyl-4-benzyloxy-2,2,6,6-tetramethylpiperidine, diethylmalonic acid di(2,2,6,6-tetramethylpiperidin-4-yl) ester, dibutylmalonic acid di(1

,2,2,6,6-pentamethylpiperidin-4-yl) ester, butyl-(3,5-di-tert-butyl-4-hydroxybenzyl)-malonic acid di(1,2,2,6,6pentamethylpiperidin-4-yl) ester, dibenzyl-malonic acid di(1,2,2,6,6-pentamethylpiperidin-4-yl) ester, dibenzyl-malonic acid di(1,2,3,6-tetramethyl-2,6-diethyl-piperidin-4-yl) ester, hexane-1',6'-bis(4-carbamoyloxy-1-n-butyl-2,2,6,6-tetramethyl-piperidine), toluene-2',4'-bis(4-carbamoyloxy-1-n-propyl-2,2,6,6-tetramethylpiperidine), dimethyl-bis(2,2,6,6-tetramethylpiperidin-4-oxy)silane, phenyl-tris(2,2,6,6-tetramethylpiperidin-4-oxy)silane, tris(1-propyl-2,2,6,6-tetramethylpiperidin-4-yl)phosphite, tris(1-propyl-2,2,6,6-tetramethylpiperidin-4-yl) phosphate, phenyl-[bis(1,2,2,6,6-pentamethylpiperidin-4-yl)]phosphonate, 4-hydroxy-1,2,2,6,6-pentamethylpiperidine, 4-hydroxy-N-hydroxyethyl-2,2,6,6-tetramethylpiperidine, 4-hydroxy-N-(2-hydroxypropyl)-2,2,6,6-tetramethylpiperidine, 1-glycidyl-4-hydroxy-2,2,6,6-tetramethylpiperidine, N,N'-bis(2,2,6,6-tetramethylpiperidin-4-yl)hexamethylene-1,6-diamine, N,N'-bis(2,2,6,6-tetramethylpiperidin-4-yl)hexamethylene-1,6-diacetamide, N,N'-bis(2,2,6,6-tetramethylpiperidin-4-yl)hexamethylene-1,6-diformamide, 1-acetyl-4-(N-cyclohexylacetamido)-2,2,6,6-tetramethylpiperidine, 4-benzoylamino-2,2,6,6-tetramethylpiperidine, N,N'-bis(2,2,6,6-tetramethylpiperidin-4-yl)-N,N'-dibutyl-adipamide, N,N'-bis(2,2,6,6-tetramethylpiperidin-4-yl)-N,N'-dicyclohexyl-2-hydroxypropylene-1,3-diamine, N,N'-bis(2,2,6,6-tetramethylpiperidin-4-yl)-p-xylylene-diamine, N,N'-bis(2,2,6,6-tetramethylpiperidin-4-yl)succine-diamide, N-(2,2,6,6-tetramethylpiperidin-4-yl)-beta-aminodipropionic acid di(2,2,6,6-tetramethylpiperidin-4-yl) ester, 4-(bis-2-hydroxyethyl-amino)-1,2,2,6,6-pentamethylpiperidine, 4-(3-methyl-4-hydroxy-5-tert-butyl-benzoic acid amido)-2,2,6,6-tetramethylpiperidine, 4-methacrylamido-1,2,2,6,6-pentamethylpiperidine, 9-aza-8,8,10,10-tetramethyl-1,5-dioxaspiro[5.5]undecane, 9-aza-8,8,10,10-tetramethyl-3-ethyl-1,5-dioxaspiro[5 .5] undecane, 8-aza-2,7,7,8,9,9-hexamethyl-1,4-dioxaspiro[4.5]decane, 9-aza-3-hydroxymethyl-3-ethyl-8,8,9,10,10-pentamethyl-1,5-dioxaspiro[5.5]undecane, 9-aza-3-ethyl-3-acetoxymethyl-9-acetyl-8,8,10,10-tetramethyl-1,5-dioxaspiro [5 .5]undecane, 2,2,6,6-tetramethylpiperidine-4-spiro-2'-(1',3'-dioxane)-5'-spiro-5"-(1",3"-dioxane)-2"-spiro-4'''-(2''',2''',6''',6'''-tetramethylpiperidine), 3-benzyl-1,3,8-triaza-7,7,9,9-tetramethylspiro[4.5]decane-2,4-dione, 3-n-octyl-1,3,8-triaza-7,7,9,9-tetramethylspiro[4.5]decane-2,4-dione, 3-allyl-1,3,8-triaza-1,7,7,9,9-pentamethylspiro[4.5]decane-2,4-dione, 3-glycidyl-1,3,8-triaza-7,7,8,9,9-pentamethylspiro[4.5]decane-2,4-dione, 1,3,7,7,8,9,9-heptamethyl-1,3,8-triazaspiro [4.5]decane-2,4-dione, 2-isopropyl-7,7,9,9-tetramethyl-1-oxa-3,8-diaza-4-oxo-spiro[4.5]decane, 2,2-di-butyl-7,7,9,9-tetramethyl-1-oxa-3,8-diaza-4- oxo-spiro[4.5]decane, 2,2,4,4-tetramethyl-7-oxa-3,20-diaza-21-oxo-dispiro[5.1.11.2] henicosane, 2-butyl-7,7,9,9-tetramethyl-1-oxa-4,8-diaza-3-oxo-spiro[4.5]decane, 8-acetyl-3-dodecyl-1,3,8-triaza-7,7,9,9-tetramethylspiro[4.5]decane-2,4dione, is(2,2,6,6-tetramethyl-piperidyl) sebacate, bis(2,2,6,6tetramethyl-piperidyl) succinate, bis(1,2,2,6,6-pentamethylpiperidyl) sebacate, n-butyl-3,5-di-tert-butyl-4-hydroxybenzyl-malonic acid bis(1,2,2,6,6pentamethylpiperidyl) ester, the condensation product of 1-hydroxyethyl-2,2,6,6-tetramethyl-4-hydroxy-piperidine and succinic acid, the condensation product of N,N'-bis(2,2,6,6-tetramethyl-4-piperidyl)-hexamethylenediamine and 4-tert-octylamino-2,6-dichloro-1,3,5-s-triazine, tris(2,2,6,6-tetramethyl-4-piperidyl)nitrilotriacetate, tetrakis(2,2,6,6-tetramethyl-4-piperidyl)-1,2,3,4-butanetetraoate, 1,1'-(1,2-ethanediyl)-bis(3,3,5,5-tetramethyl-piperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl) malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetramethylpiperidyl) succinate, the condensation product of N,N'-bis(2,2,6,6-tetramethyl-4-piperidyl)hexamethylenediamine and 4-morpholino-2,6-dichloro-1,3,5-triazine, the condensation product of 2-chloro-4,6-di(4-n-butylamino-2,2,6,6-tetramethylpiperidyl)-1,3,5-triazin e and 1,2-bis(3-aminopropylamino)ethane, the condensation product of 2-chloro-4,6-di (4-n-butylamino-1,2,2,6,6-pentamethylpiperidyl)-1,3,5-triazine and 1,2-bis(3-aminopropylamino)ethane, 8-acetyl-3 -dodecyl-7,7,9,9-tetramethyl-1,3,8-triazaspiro[4.5]decane-2,4-dione, 3-dodecyl-1-(2,2,6,6-tetramethyl-4-piperidyl) pyrrolidine-2,5-dione and 3-dodecyl-1-(1,2,2,6,6-pentamethyl-4-piperidyl)-pyrrolidine-2,5-dione.

It would be understood by the skilled person that the amount of sterically hindered amine added would depend on the desired degree of stabilization sought. In the present invention, the amount of sterically hindered amine stabiliser added may range from 0.01 to 0.5% by weight, preferably from 0.05 to 0.5% by weight, based on the thermoplastic component, such as PVC, that has been added.

In another preferred embodiment, the stabilising component is a hydrotalcite or an alkali (alkaline earth) aluminosilicate (such as zeolites). Suitable examples of hydrotalcites include, but are not limited to, $Al_2O_3.6MgO.CO_2.12H_2O$, $Mg_{4.5}Al_2(OH)_{13}.CO_3.3.5H_2O$, $4MgO.Al_2O_3.CO_2.9H_2O$, $4MgO.Al_2O_3.CO_2.6H_2O$, $ZnO.3MgO.Al_2O_3.CO_{2.8-9}H_2O$ and $ZnO.3MgO.Al_2O_3CO_2.5-6H_2O$. Suitable examples of zeolites (alkali and alkaline earth aluminosilicates) include, but are not limited to, $Na_{12}Al_{12}Si_{12}O_{48}.27H_2O$ [zeolite A], $Na_6Al_6Si_6O_{24}.2NaX.7.5H_2O$ where X=OH, Cl, ClO4, 1/2CO_3 [sodalite], $Na_6Al_6Si_{30}O_{72}.24H_2O$, $Na_8Al_8Si_{40}O_{96}.24H_2O$, $Na_{16}Al_{16}Si_{24}O_{80}.16H_2O$, $Na_{16}Al_{16}Si_{32}O_{96}.16H_2O$, $Na_{56}Al_{56}Si_{136}O_{384}.250$ $H_2O$ [zeolite Y], $Na_{86}Al_{86}Si_{106}O_{384}.264H_2O$ [zeolite X], and zeolites of the X and Y type having an Al/Si ratio of about 1:1, or the zeolites that can be formed by partial or complete replacement of the Na atoms by Li, K, Mg, Ca, Sr, Ba or Zn atoms, such as $(Na,K)_{10}Al_{10}Si_{22}O_{64}.20H_2O$, $Ca_{4.5}Na_3[(AlO_2)_{12}(SiO_2)_{12}].30H_2O$, $K_9Na_3[(AlO_2)_{12}(SiO_2)_{12}]$ $.27H_2O$.

In some embodiments, the zeolites listed may have lower water content or may be anhydrous as described in J. Chem. Soc. 1952,1561-1571, J. Chem. Soc. 1956, 2882, Am. Mineral. 54 1607 (1969), and in U.S. Pat. Nos. 2,950,952, 4,503,023, 4,503,023.

The chemical composition of other hydrotalcites and an alkali (alkaline earth) aluminosilicates that may be suitable for use in the present thermoplastic composition and may be found, for example, from patent specifications U.S. Pat. No. 40,00,100, EP 062 813 and WO 93/20135.

The hydrotalcites and/or zeolites may be used in amounts of, for example, from 0.1 to 20, preferably from 0.1 to 10, and most preferably from 0.1 to 8, parts by weight, based on 100 parts by weight of the chlorinated thermoplastic polymer, such as PVC.

In another preferred embodiment, the stabilising component is an alkali aluminocarbonate (such as dawsonites). Those compounds that can be used according to the present invention may be naturally occurring minerals or synthetically prepared compounds. Suitable examples of naturally occurring alumino salt compounds include, but are not limited to, indigirite, tunisite, aluminohydrocalcite, paraaluminohydrocalcite, strontiodresserite and hydrostrontiodresserite. Other examples of alumino salt compounds are potassium aluminocarbonate $[(K_2O).(Al_2O_3).(CO_2)_2.2H_2O]$, sodium aluminothiosulfate $[(Na_2O).(Al_2O_3).(S_2O_2)_2.2H_2O]$, potassium aluminosulfite $[K_2O).(Al_2O_3).(SO_2)_2.2H_2O]$, calcium aluminooxalate $[(CaO).(Al_2O_3).(C_2O_2)_2.5H_2O]$, magnesium aluminotetraborate $[(MgO).(Al_2O_3).(B_4O_6)_2.5H_2O]$, $[([Mg_{0.2}Na_{0.6}]_2O).(Al_2O_3).(CO_2)_2.4.1H_2O]$, $[([Mg_{0.2}Na_{0.6}]_2O).(Al_2O_3).(CO_2)_2.4.3H_2O]$ and $[([Mg_{0.3}Na_{0.4}]_2O).(Al_2O_3).(CO_2)_{2.2}.4.9H_2O]$. Other alumino salt compounds include, but are not limited to, $M_2O.Al_2O_3/(CO_2)_2.pH_2O$, $(M_2O)_2.(Al_2O_3)_2.(CO_2)_2.pH_2O$ and $M_2O.(Al_2O_3)_2.(CO_2)_2.pH_2O$ wherein M is a metal, such as Na, K, Mg½, Ca½, Sr½ or Zn½ and p is a number from 0 to 12.

The alkali aluminocarbonate dawsonites may also be substituted by lithium-aluminohydroxycarbonates or lithium-magnesium-aluminohydroxycarbonates, as described in EP 549,340.

The alkali aluminocarbonates may be used in an amount of, for example, from 0.01 to 10, preferably from 0.05 to 8, more preferably from 0.1 to 5, parts by weight, based on 100 parts by weight of chlorinated thermoplastic polymer, such as PVC.

In another preferred embodiment, the stabilising component is a zinc compound. Suitable examples of zinc compounds are the zinc salts of monovalent carboxylic acids, such as acetic acid, propionic acid, butyric acid, valeric acid, hexanoic acid, oenanthic acid, octanoic acid, neodecanoic acid, 2-ethylhexanoic acid, pelargonic acid, decanoic acid, undecanoic acid, dodecanoic acid, tridecanoic acid, myristic acid, palmitic acid, lauric acid, isostearic acid, stearic acid, 12-hydroxystearic acid, 9,10-dihydroxystearic acid, oleic acid, 3,6-dioxaheptanoic acid, 3,6,9-trioxadecanoic acid, behenic acid, benzoic acid, p-tert-butylbenzoic acid, dimethylhydroxybenzoic acid, 3,5-di-tert-butyl-4-hydroxybenzoic acid, toluic acid, dimethylbenzoic acid, ethylbenzoic acid, n-propylbenzoic acid, salicylic acid, p-tert-octylsalicylic acid, and sorbic acid, zinc salts of divalent carboxylic acids or the monoesters thereof, such as oxalic acid, malonic acid, succinic acid, glutaric acid, adipic acid, fumaric acid, pentane-1,5-dicarboxylic acid, hexane-1,6-dicarboxylic acid, heptane-1,7-dicarboxylic acid, octane-1,8-dicarboxylic acid, 3,6,9-trioxadecane-1,10-dicarboxylic acid, lactic acid, malonic acid, maleic acid, tartaric acid, cinnamic acid, mandelic acid, malic acid, glycolic acid, oxalic acid, salicylic acid, polyglycol-dicarboxylic acid, phthalic acid, isophthalic acid, terephthalic acid and hydroxyphthalic acid; and the di- or tri-esters of tri- or tetra-valent carboxylic acids, such as hemimellitic acid, trimellitic acid, pyromellitic acid, citric acid and the overbased zinc carboxylates. Other suitable examples of zinc compounds include, but are not limited to, the zinc enolates such as enolates of acetylacetone, benzoylacetone or dibenzoylmethane and enolates of acetoacetates and benzoyl acetates and of dehydroacetic acid. Inorganic zinc compounds, such as zinc oxide, zinc hydroxide, zinc sulfide and zinc carbonate, may also be suitable.

In some embodiments, preference is given to zinc soaps such as benzoates, alkanoates, alkanoates, stearates, oleates, laurates, palmitates, behenates, versatates, hydroxystearates, dihydroxystearates, p-tert-butylbenzoates, (iso)octanoates and 2-ethylhexanoate.

In some embodiments, organic aluminium, cerium or lanthanum carboxylates and enolate compounds having a metal-O bond may also be used.

The zinc and metal compounds may be used in amounts of, for example, from 0.001 to 10, preferably from 0.01 to 8, and more preferably from 0.01 to 5, parts by weight, based on 100 parts by weight of chlorinated thermoplastic polymer, such as PVC.

In other embodiments, organotin stabilisers, carboxylates, mercaptides and sulfides may be used. Examples of suitable compounds may be found in U.S. Pat. No. 4,743,640.

In some embodiments, the stabiliser component may be provided with additional stabilisers, auxiliaries and processing agents, such as alkali metal and alkaline earth metal compounds, glidants (or lubricants), plasticisers, pigments, fillers, phosphites, thiophosphites and thiophosphates, mercaptocarboxylic acid esters, epoxidised fatty acid esters, antioxidants, UV absorbers and light stabilisers, optical brighteners, impact strength modifiers and processing aids, gelling agents, antistatic agents, biocides, metal deactivators, fireproofing agents and propellants, and antifogging agents.

Further details of the stabilisers useful in the present thermoplastic compositions described herein as well as other stabiliser components may be found in EP768336 and EP 0492803.

The thermoplastic compositions of the present invention comprise at least one lubricant (or at least one release agent). Some examples of lubricants suitable for use in the present invention include, but are not limited to, fatty acids, fatty alcohols, fatty acid esters, fatty alcohol esters, fatty acid amides, polyol esters, polyethylene waxes, oxidised polyethylene waxes, polypropylene waxes, Fischer-Tropsch paraffins, paraffin waxes, oligomeric esters ('complex esters'), montanic acid esters, soaps, metal soaps of fatty acids, and metal soaps of montanic acids. An overview of other lubricants that may be useful in the thermoplastic compositions of the present invention may be found in 'PVC Additives', Hanser Publishing Munich, 2015, ISBN 978-1-56990-543-2. In some circumstances, it has been observed that the use of lubricants and release agents have an influence on other properties of the thermoplastic composition such as antistatic and antifogging properties.

In order to provide the correct layer adhesion during FDM 3D printing, the present inventors have identified that processing with external lubricants normally associated with chlorinated thermoplastic polymers, such as PVC and CPVC, should not be used at 'normal' formulation levels, such as 0.1-2 phr max. In particular, the external lubricants should preferably be used in amounts that complement the desired melt flow rate of the thermoplastic polymer or thermoplastic composition in 3D printing. Examples of external lubricants include, but are not limited to, Fischer-Tropsch waxes, paraffin waxes, polyethylene waxes, esterified polyol esters (fully or partially) and other external lubricants known in the art.

The lubricants useful in the present invention include, but are not limited to, Montan wax, fatty acid esters, PE waxes, amide waxes, chloroparaffins, glycerol esters and alkaline earth metal soaps. Fatty ketones may also be used, as described in DE 42 04 887, and of silicone-based lubricants, as described in EP 225 261, or combinations thereof, as described in EP 259 783.

The thermoplastic composition of the present invention requires a suitable balance of stabilising and lubricating properties compared with the balance of stabilising and lubricating properties required with other plastic compositions used in non-3D printing applications. The balance of stabilising and lubricating properties should be chosen to achieve the desired interlayer adhesion properties of the thermoplastic composition.

Other components normally used with the chlorinated thermoplastic polymer (such as PVC) compositions and processes may be included in the thermoplastic compositions of the present invention. These "other" components are disclosed for example, in 'International Plastics Handbook', Hanser Publishing Munich, 2006, ISBN 3-56990-399-5; 'PVC Handbook', Hanser Publishing Munich, 2005, ISBN 3-446-22714-8 and in 'PVC Additives', Hanser Publishing Munich, 2015, ISBN 978-1-56990-543-2.

In a preferred embodiment, the thermoplastic polymer is a stabilised PVC polymer. Most preferably, the PVC polymer is a PVC homopolymer. The PVC homopolymer may have a K-value range of from 40 to 80. Preferably, the PVC homopolymer has a K-value range of 45 to 71. Most preferably, the PVC homopolymer has a K-value of about 45, about 50, about 57 or about 71.

In situations where the thermoplastic polymers or thermoplastic compositions have a higher viscosity, the final melt viscosity should be adjusted to a melt flow rate (MFR) of 0.5 to 30, preferably 2 to 20, more preferably 5 to 15, determined at 205° C. according to ASTM D1238. The viscosity may be adjusted to the desired viscosity by using, for example, plasticisers and other additives.

In another preferred embodiment, the thermoplastic polymer is a blend of polymers.

In this embodiment, the blend may be a mixture including PVC and another polymer, such as polyacrylate (such as Vinnolit 704). Alternatively, the polymer blend may be PVC with CPVC, ABS, ASA, CA, PC, PMMA, PBTP, TPU, SAN, SMA or polyketone. Compatibilisers may be used in the polymer blend, if required.

In certain embodiments, additives commonly used in thermoplastic processing may be used. Such additives include, but are not limited to, fillers, reinforcing agents, calcium carbonate (ground natural and precipitated), kaolin, talc, mica, barite, wollastonite, calcium sulfate, huntites and feldspars, as well as artificial fillers such as glass fibres, glass micro beads, fly ash products, magnesium hydroxide, aluminium hydroxide (ATH), wood-fibres and other plant fibres.

In certain embodiments, pigments may be added as required and grades suitable for plastics should be used. Any organic and inorganic pigments and pigment preparations that are suitable for mixing with plastics and tolerate heating (i.e., does not decompose upon heating at 3D printing processing temperatures) may be used. For example, titanium dioxide is one preferred pigment. Heavy metal pigments and environmentally toxic metal pigments, such as chromium, lead and cadmium-based pigments should be avoided. Carrier additives complying with 3D printing processing requirements may also be used.

In certain embodiments, modifiers and processing aids may be used. Processing aids may include those based on low, medium and high molecular weight acrylic polymer resins and copolymers. In this embodiment, any one or more of: impact modifiers, flow modifiers and foam modifiers are preferably used. Preferably, acrylic impact modifiers may be used. These modifiers may be chlorinated polyethylenes (CPEs) or those based on acrylate or methacrylate-butadiene-styrene (MBS) technology. The amounts at which modifiers may be used in the 3D printable compositions of the present invention would be dictated by the molecular weight of the thermoplastic polymer component and/or the thermoplastic composition, and/or the viscosity thereof, as discussed herein.

In certain embodiments, the thermoplastic polymer or thermoplastic composition of the present invention may comprise plasticisers. A suitable amount of plasticiser may be added to the thermoplastic polymer or thermoplastic composition to achieve the desired viscosity required for 3D printing. In other embodiments, the amount of plasticiser added may be adjusted to provide thermoplastic polymer or thermoplastic compositions that are capable of forming flexible filaments for FDM 3D printing processes. In one preferred embodiment, when PVC is used as a thermoplastic polymer component in the thermoplastic composition, a suitable amount of plasticiser may be added to form a truly flexible PVC filament for FDM 3D printing of 3D products.

A variety of plasticisers known in the art may be added to the thermoplastic polymer or thermoplastic composition. When plasticisers are incorporated into the thermoplastic composition, the preferred plasticisers are low volatility plasticisers, such as long-chain phthalates (e.g. DIDP, DINP), DINCH, trimellitates (e.g., TOTM, TIOTM), adipates, terephthalates, polymeric plasticisers (e.g. Edenol 1208), citrates, epoxidised oils (e.g., ESBO, HM 828) and other plasticising components that are compatible with chlorinated thermoplastic polymer, including PVC.

In certain embodiments, if desired, functional additives may be added to the thermoplastic polymer or thermoplastic composition of the present invention. The functional additives may include, but are not limited to, flame retardants, anti-microbial additives, fungicides, blowing agents, conductivity agents, graphene, nanoparticles, other special functional additives known in the art and any mixture thereof.

Examples

The following PVC rigid compositions were prepared as dryblends, generally mixed to 120° C.; for the compositions containing plasticiser, the plasticiser was added at 60° C. and the dryblend then mixed to 110° C., as is standard procedure for PVC processing. Then the dry blends were extruded on a Polylab laboratory twin screw extruder under standard extrusion conditions into filaments of 1.75 mm diameter.

The filaments were then 3D printed on a Reprap-style "Makergear M Series" 3D printer into a 3D printing test piece (http://www.thingiverse.com/thing:704409t) that allows assessment of 3D printing performance. The 3D printing parameters were adjusted to the following conditions: Print speed 50 mm/s; printing temperature to commence the print immediately once PVC is in the "hot-end", set to 190-290° C. manually on the host program; bed temperature to also commence the print immediately once PVC is in the "hot-end", set to 100° C. manually on the host program. Stainless steel nozzle (required for PVC) size 0.4 mm.

Determination of MFR values were performed on a Davenport Daventest MFI tester Type UT 731/016 (made in UK) according to ASTM D1238, Procedure A, measured at 205° C. with a 2.16 kg nominal weight and a die of bore diameter=2.0955 +/−0.0051mm, bore length =8+/−0.025mm. Procedure A is used to determine the melt flow rate (MFR) of any thermoplastic material. The units of measure are grams of material/10 minutes (g/10 min). The unit is based on the measurement of the mass of material that extrudes from the die over a given period of time. Procedure A is generally not recommended for PVC as it is generally used for materials having melt flow rates that fall between 0.15 and 50 g/10 min but it is suited for the chlorinated thermoplastic polymer or thermoplastic compositions (e.g. PVC or PVC-containing compositions) required for 3D printing.

Layer adhesion was determined by 3D FDM printing the above test specimens. If this was unsuccessful, the composition is deemed "not 3D printable".

For compositions with good layer adhesion, a test sample for tensile testing was made by, 3D printing test samples according to the dimensions of test specimen for ASTM D638.

The following non-limiting examples of the present invention will now be described.

It would be understood that where appropriate, commercially available components may be used as a substitute of the components listed in the non-limiting examples.

In the tables below the following components are listed:
PVC K 57=commercially available PVC with a K-value of 57
PVC K 50=commercially available PVC with a K-value of 50
Titanium dioxide=white pigment for plastics
Calcium carbonate=commercial filler as recommended for plastics
Sasol H1=commercial wax lubricant
Sasol C80=commercial wax lubricant
Honeywell Rheolub RL-165=commercial wax lubricant
Licowax PE520=commercial wax lubricant
Kaneka PA 40=commercial modifier
DINCH =commercial plasticiser
Vinnolit 704=commercial PVC copolymer
Licowax OP=commercial montan wax lubricant
Clearstrength W-300=commercial acrylic impact modifier
ESBO=commercially available epoxidised soybean oil, a liquid co-stabiliser
Naftosafe CP 3D-Vinyl stabilisers=stabiliser one packs, commercially available products of Chemson Pacific PTY LTD, 2 Capicure Drive, Eastern Creek, NSW, Australia Chlorinated Thermoplastic with Plasticiser The following plasticiser-containing compositions shown in Table 1 were prepared as above and the 3D printing properties assessed.

Chlorinated Thermoplastic with Plasticiser and separate acrylic modifier

TABLE 1

| Chlorinated Thermoplastic with Plasticiser | | | |
|---|---|---|---|
| PHR | Example A | Comparison I | Example B |
| PVC K 57 | 100.00 | 100.00 | 100.00 |
| Titanium dioxide | 4.00 | 4.00 | 4.00 |
| Calcium carbonate | 20.00 | 20.00 | 20.00 |
| Sasol H1 | | 0.20 | |
| Naftosafe CP 3D-Vinyl 70 | 3.44 | 3.44 | |
| Naftosafe CP 3D-Vinyl 47 | | | 7.17 |
| Sasol C80 | | 0.40 | |
| Honeywell Rheolub RL-165 | 0.10 | 0.10 | 0.10 |
| Licowax PE520 | 0.09 | 0.09 | 0.09 |
| Kaneka PA40 | 2.94 | 2.94 | 3.00 |
| DINCH | 20.00 | 20.00 | 20.00 |
| MFR-value [at 205° C. in g/10 mins] | 12.3 | 0.4 | 9.2 |

The compositions according the present invention provided a 3D printable filament whereas the normally lubricated formulation (comparison) resulted in unsuitable layer adhesion and was thus not considered to be 3D printable. Increasing the amounts of stabilising components in the composition without adjusting the external lubricants allowed for a 3D printable composition.

Chlorinated Thermoplastic with Plasticiser and PVC-grafted Acrylic Modifier

In the following compositions shown in Table 2 the acrylic component is a grafted acrylic-PVC polymer (Vinnolit 704).

TABLE 2

| Chlorinated Thermoplastic with Plasticiser and PVC-grafted Acrylic Modifier | | |
|---|---|---|
| PHR | Example C | Comparison II |
| PVC K 57 | 100.00 | 100.00 |
| Vinnolit 704 | 10.00 | 10.00 |
| Titanium dioxide | 4.00 | 4.00 |
| Calcium carbonate | 20.00 | 20.00 |
| Naftosafe CP 3D-Vinyl 70 | 4.73 | 4.73 |
| Honeywell Rheolub RL-165 | 0.14 | 0.14 |
| Licowax PE520 | 0.12 | 0.12 |
| Licowax OP | | 0.40 |
| DINCH | 20.00 | |
| MFR-value [at 205° C. in g/10 mins] | 10.6 | 0.7 |

The formulations according to the present invention provided a 3D printable filament even despite increased stabilising components in combination with the PVC co-polymer. Removing the plasticiser and adding external lubricant (comparison) resulted in a better filament extrusion but gave virtually no layer adhesion, thus a non-3D-printable composition.

Chlorinated Thermoplastic with no Plasticiser and Low Viscosity PVC

The following formulations shown in Table 3 contain no plasticiser, but are based on a low viscosity PVC.

TABLE 3

| Chlorinated Thermoplastic with no Plasticiser and Low Viscosity PVC | | |
|---|---|---|
| PHR | Example D | Comparison III |
| PVC K 57 | | 100.00 |
| PVC K 50 | 100.00 | |
| Clearstrength W-300 | 3.00 | 3.00 |
| Naftosafe CP 3D-Vinyl 81 | 3.40 | 3.40 |
| ESBO | 5.00 | 5.00 |
| MFR-value [at 205° C. in g/10 mins] | 9.3 | 4.8 |

The compositions according to the present invention provided a 3D printable filament which resulted in 3D printed product of excellent definition. Increasing the PVC viscosity without other viscosity-reducing components in this composition (comparison) resulted in significant warping and worse definition.

Other embodiments and uses of this invention will be apparent to those having ordinary skill in the art upon consideration of the specification and figures of the invention disclosed herein. The specification given should be considered as exemplary only, and it is contemplated that the appended claims will cover any other such embodiments or modifications that fall within the scope of the invention disclosed herein.

The invention claimed is:

1. A method of making a 3D product formed by additive manufacturing,
    wherein the method comprises introducing into an additive manufacturing machine a thermoplastic polymer derived from a chlorinated monomer unit or a thermoplastic composition comprising at least one thermoplastic polymer derived from a chlorinated monomer unit and at least one stabiliser, wherein the thermoplastic polymer or composition has a melt flow rate (MFR) suitable for additive manufacturing from 0.5 to 30 as determined at 205° C. according to ASTM D1238 and comprises a suitable fluidity for a melt deposition step.

2. The method of claim 1, wherein the additive manufacturing machine utilises a fused deposition modelling (FDM) or a fused filament fabrication (FFF) technique.

3. The method of claim 1, wherein the thermoplastic composition further comprises at least one lubricant.

4. The method of claim 1, wherein the MFR is from 2 to 20, as determined at 205° C. according to ASTM D1238.

5. The method of claim 1, wherein the MFR is from 5 to 15, as determined at 205° C. according to ASTM D1238.

6. The method of claim 1, wherein the thermoplastic polymer or thermoplastic composition has a relevant tensile strength.

7. The method of claim 6, wherein the tensile strength of the thermoplastic polymer or thermoplastic composition is from 15 to 60 MPa, measured according to ASTM 1238.

8. The method of claim 1, wherein the tensile strength of the thermoplastic polymer or thermoplastic composition is from 20 to 60 MPa, measured according to ASTM 1238.

9. The method of claim 1, wherein the tensile strength of the thermoplastic polymer or thermoplastic composition is about 30 MPa, measured according to ASTM 1238.

10. The method of claim 1, wherein the thermoplastic polymer is polyvinyl chloride (PVC) or chlorinated polyvinyl chloride (CPVC).

11. The method of claim 1, wherein the thermoplastic polymer is copolymerized with comonomer units selected from ethylenically unsaturated carboxylic acids, ethylenically unsaturated carbonates, ethylenically unsaturated urethanes, ethylenically unsaturated alcohols, and ethylenically unsaturated aromatics.

12. The method of claim 1, wherein the thermoplastic polymer is copolymerized with comonomer units selected from alkyl acrylates, alkyl methacrylates, ethylene vinyl alcohols, vinyl acetates, styrenes, and hydroxyalkanoic acid, wherein the hydroxyalkanoic acids have five or fewer carbon atoms including glycolic acid, lactic acid, 3-hydroxypropionic acid, 2 hydroxybutyric acid, 3-hydroxybutyric acid, 4-hydroxybutyric acid, 3-hydroxyvaleric acid, 4-hydroxyvaleric acid, 5-hydroxyvaleric acid, or combinations of two or more thereof.

13. The method of claim 12, wherein the alkyl groups of the alkyl acrylates and alkyl methacrylates have from 1 to 10 carbon atoms.

14. The method of claim 11, wherein at least a portion of the carboxylic acid groups in the copolymer are neutralized to salts containing alkali metal cations, alkaline earth metal cations, transition metal cations, or combinations thereof.

15. The method of claim 1, wherein the thermoplastic composition, comprising at least one thermoplastic polymer derived from a chlorinated monomer unit, comprises thermoplastic materials selected from a polyolefin, a polyhydroxyalkanoate (PHA), a polyesters, a polyester elastomer, a polyamide (PA), a polystyrene, a polyketone, a polyvinyl chloride (PVC), a chlorinated polyvinyl chloride (CPVC), a polyvinylidene chloride, an acrylic resin, a vinyl ester resin, a polyurethane elastomer and a polycarbonate.

16. The method of claim 15, wherein the polyolefin is linear low-density polyethylene, low-density polyethylene, middle-density polyethylene, high-density polyethylene, ethylene-vinyl acetate copolymer, ethylene-alkyl acrylate copolymer, ethylene-propylene copolymer, polypropylene, propylene-a-olefin copolymer, polybutene, polypentene, chloropolyethylene, chloropolypropylene, or combinations of two or more thereof.

17. The method of claim 1 wherein the thermoplastic polymer is polyvinyl chloride and has a K-value of between about 40 and about 80.

18. The method of claim 1, wherein the thermoplastic composition comprises any one or more of a plasticiser, a compatibilizer, a filler, a reinforcing agent, a pigment, a modifier, a processing aid, a release agent, a flame retardant, an anti-microbial additive, a fungicide, a blowing agent, a conductivity agent, a wood fibre, a bamboo, a chalk, a metal, and an other additive.

19. The method of claim 1, wherein the thermoplastic composition comprises a low VOC plasticiser.

20. The method of claim 1, wherein the at least one stabilizer is substantially free of lead, cadmium and/or barium.

21. The method of claim 1, wherein the thermoplastic polymer or thermoplastic composition is provided in the form of a powder, a powder-blend, a pellet, a granule or a filament.

22. The method of claim 1, wherein the thermoplastic polymer or the thermoplastic composition is free or substantially free of sulfur-tin based stabilisers.

23. The method of claim 1, wherein the thermoplastic polymer comprises a polyvinyl chloride (PVC) homopolymer.

24. The method of claim 1, wherein the thermoplastic polymer is a polyvinyl chloride (PVC) homopolymer.

25. The method of claim 1, wherein the thermoplastic polymer is polyvinyl chloride and has a K-value of between about 40 and about 80; 45 to 48; 50 to 55; 58 to 60; 62 to 65; 66 to 68; 70 to 71; 80; or the K-value is about 45, about 50, about 57 or about 71, and wherein the viscosity is modified with plasticisers and/or additives.

* * * * *